(No Model.)

C. G. PURDY.
FILTER.

No. 454,766. Patented June 23, 1891.

WITNESSES:
J. Henry Theberath
C. Sedgwick

INVENTOR.
C. G. Purdy
BY
Munn
ATTORNEYS

UNITED STATES PATENT OFFICE.

CHARLES G. PURDY, OF BROOKLYN, NEW YORK.

FILTER.

SPECIFICATION forming part of Letters Patent No. 454,766, dated June 23, 1891.

Application filed May 29, 1890. Renewed April 3, 1891. Serial No. 387,543. (No model.)

*To all whom it may concern:*

Be it known that I, CHARLES G. PURDY, of Brooklyn, in the county of Kings and State of New York, have invented a new and Improved Filter, of which the following is a full, clear, and exact description.

My invention relates to water or fluid filters, and has for its object to provide an improved filter tube or body and to combine it in such manner with the partition which separates the unfiltered and filtered fluid chambers of the filter as to insure a perfectly tight joint of the tube or body with the partition while preventing contamination of the filtered liquid by the joint or its packing and assuring durability of the tube and packing, the construction allowing the filtering tube or body to be removed or replaced at pleasure.

The invention will first be described, and then will be particularly pointed out in the claims.

Reference is to be had to the accompanying drawings, forming a part of this specification, in which similar letters of reference indicate corresponding parts in all the figures.

Figure 1:
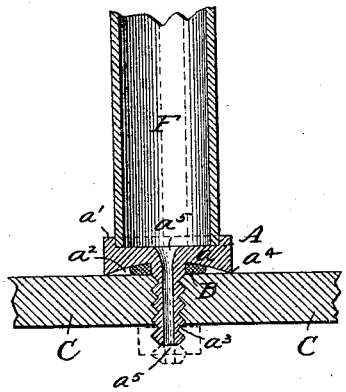
Figure 3:
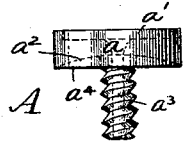
Figure 4:
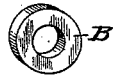
Figure 2:
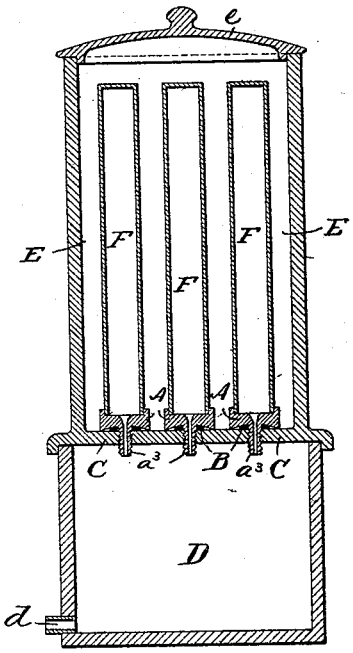

Figure 1 is a detail vertical sectional view illustrating my improvement as applied to a single filtering tube or body and the filter-partition to which the tube or body is fitted. Fig. 2 is a vertical sectional view of a filter with the tubes fitted thereto in accordance with my invention. Fig. 3 is a side view of the screw-nozzle of the filtering-tube, drawn to the same scale as in Fig. 1. Fig. 4 is a perspective view of the packing which I use under the concaved base-plate of the filtering-tube nozzle.

My present improvement consists, mainly, in the peculiarly-formed filtering-tube nozzle A, which preferably has a packing B interposed between its base-plate and the partition C, which separates the filtered and unfiltered liquid chambers D E of a filter. These chambers and the cover $e$ of the chamber E, forming the body of the filter, may be made in any design and of any approved substance or materials, and any suitable faucet may be connected to the outlet $d$ of the chamber D for drawing off the filtered liquid.

The filter shown in Fig. 2 of the drawings has three filtering tubes or bodies F of a kind or shape commonly employed in filters of this general character, and each tube or body is fitted at its lower open end within a top recess of the base-plate $a$ of the nozzle A and preferably by liquid cement, which hardens by baking, so as to practically glaze the nozzle fast to the tube and allow the nozzle to be screwed tightly to the partition-plate C by grasping and turning the tube or body. The nozzle A is preferably made with an upwardly-extending marginal flange $a'$ around its base-plate $a$ to form a seat or recess for the filtering-tube, and at its lower face the plate is concaved upward at $a^2$ all around the downwardly-projecting threaded stem $a^3$, which screws into the filter-partition C. This concavity provides at the lower margin of the base-plate a rather sharp circumferential or marginal edge $a^4$, which makes a very close or tight joint with the partition C, when the threaded stem is screwed fully into the partition or securely retained therein in any approved manner. The joint of the nozzle-base-plate edge $a^4$ with the partition C would alone make a liquid-tight connection of the nozzle with the partition to prevent passage through this joint of unfiltered liquid from the filter-chamber E to the lower chamber D and compel filtration of the fluid through the closed walls of the filtering-tube F into the interior of the tube or body, whence the filtered fluid escapes into the chamber D through a central bore or perforation $a^5$, made in or through the nozzle base-plate and stem. I prefer, however, to employ the rubber or other suitable packing B, which is slipped onto the threaded stem of the nozzle prior to screwing or fastening it into the filter-partition C. This packing or washer B is slightly thicker than the depth of the concavity $a^2$ of the nozzle base-plate. Consequently as the threaded stem of the nozzle is screwed fully home to press the edge $a^4$ tightly to the partition C, as above described, the packing B will be compressed vertically and expanded laterally, whereby it will be forced most tightly to the stem and at the same time be very tightly clamped between the nozzle base-plate and the partition to assure a perfectly tight joint of the nozzle with the partition inside of or within the concavity of the nozzle base-plate. It will also be noticed that the tight joint of the lower marginal edge $a^4$ of the nozzle base-plate $a$ with the partition C prevents the unfiltered liquid coming in contact with the packing and being contaminated or tainted by it, and whereby also the durability of the packing is assured. In filtering acidulous liquids—such as vinegar, grape or apple juice, or lemon extracts—this protection of the packing within the concavity of the nozzle base-plate is of the first importance in preserving the flavor of the liquid and protecting the packing.

The tube-nozzle A may be made of porcelain, hard rubber, or any other suitable material, this depending somewhat on the nature of the liquid to be filtered. In so far as the operation of the filter-tube nozzle and packing is concerned it is immaterial whether the filter tube or tubes rise above the partition C or hang pendent from it, as may be preferable in some styles of filters.

I wish it to be understood that I am not limited to the use of the preferred nozzle-stem $a^3$, having an exterior thread which screws directly into the partition C of the filter, as the stem may be extended at its outer end sufficiently beyond the face of the partition to receive a nut on its threaded extremity for binding the nozzle and tube securely to the partition, and as indicated by dotted lines in Fig. 1 of the drawings.

It is obvious that I am not limited to a filtering tube or body of cylindrical general form, as the hollow filtering-body, which may be made of any suitable substance or materials, may have globular or other shape and be held with a packing to the filter-partition in accordance with my invention.

Having thus described my invention, what I claim as new, and desire to secure by Letters Patent, is—

1. In a filter, the combination, with a partition separating its unfiltered and filtered fluid chambers, of a filtering tube or body having an apertured head-piece or nozzle which is concaved at its joint-face which bears on the partition, and a packing interposed between the concaved face of the tube-nozzle and the partition, substantially as described, whereby the concaved joint-face of the tube protects the fluid being filtered from contamination by the packing and the packing is preserved from injury by the fluid, as set forth.

2. In a filter, the combination, with the partition separating its unfiltered and filtered fluid chambers, of a filtering tube or body provided with a nozzle having a concaved face which bears on the partition, a screw-threaded stem held in the partition and a filtered-fluid-discharge aperture, and a packing retained between the concaved face of the tube and the partition, substantially as described.

CHARLES G. PURDY.

Witnesses:
HENRY L. GOODWIN,
EDGAR TATE.